US012569972B2

(12) United States Patent
Abbott et al.

(10) Patent No.: US 12,569,972 B2
(45) Date of Patent: Mar. 10, 2026

(54) ADAPTABLE MOTOR CONTROL OF MODULAR POWER TOOL

(71) Applicant: Milwaukee Electric Tool Corporation, Brookfield, WI (US)

(72) Inventors: Jonathan E. Abbott, Milwaukee, WI (US); Maxwell L Merget, Whitefish Bay, WI (US); Levi D. Speckman, Elkhorn, WI (US); Carter H. Ypma, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 18/488,202

(22) Filed: Oct. 17, 2023

(65) Prior Publication Data

US 2024/0123590 A1 Apr. 18, 2024

Related U.S. Application Data

(60) Provisional application No. 63/379,934, filed on Oct. 18, 2022.

(51) Int. Cl.
*B25F 3/00* (2006.01)
*B25F 5/00* (2006.01)

(52) U.S. Cl.
CPC ................ *B25F 3/00* (2013.01); *B25F 5/001* (2013.01)

(58) Field of Classification Search
CPC .................................. B25F 3/00; B25F 5/001
USPC .......................................................... 173/217
See application file for complete search history.

(56) References Cited

U.S. PATENT DOCUMENTS

| | | | | |
|---|---|---|---|---|
| 5,033,552 A * | 7/1991 | Hu | B25B 21/00 | 241/37.5 |
| 9,776,315 B2 * | 10/2017 | Cannaliato | B25F 5/021 | |
| 10,011,008 B2 * | 7/2018 | Herr | B25F 3/00 | |
| 2013/0020106 A1 * | 1/2013 | Kuehne | B25F 5/02 | 173/214 |
| 2013/0118767 A1 * | 5/2013 | Cannaliato | B25F 3/00 | 173/29 |
| 2014/0102742 A1 * | 4/2014 | Eshleman | B25B 21/004 | 173/183 |
| 2016/0167186 A1 * | 6/2016 | Chan | G05B 19/4185 | 173/2 |
| 2018/0065232 A1 * | 3/2018 | Mueckl | B25B 21/00 | |
| 2018/0178366 A1 * | 6/2018 | Matei | B25B 21/00 | |
| 2019/0160643 A1 * | 5/2019 | Lefavour | B25F 5/005 | |
| 2019/0217459 A1 * | 7/2019 | Gregorich | B23D 51/16 | |
| 2019/0227528 A1 * | 7/2019 | Abbott | G05B 13/027 | |

(Continued)

FOREIGN PATENT DOCUMENTS

WO 2022081945 A1 4/2022

*Primary Examiner* — Thomas M Wittenschlaeger
*Assistant Examiner* — Katie L Gerth
(74) *Attorney, Agent, or Firm* — Quarles & Brady LLP

(57) ABSTRACT

A power tool includes an electronic controller including a processor and a memory, one or more attachments, a motor, and a sensor communicatively coupled to the electronic controller. The electronic controller obtains, via the sensor, one or more indications for the one or more attachments and determines information about a configuration of the one or more attachments based on the one or more indications. The electronic controller adaptively controls the motor based on the information about the configuration to, for example, prevent or mitigate a kickback occurrence.

21 Claims, 6 Drawing Sheets

(56) References Cited

U.S. PATENT DOCUMENTS

| | | | | |
|---|---|---|---|---|
| 2019/0308309 | A1* | 10/2019 | Gregorich | B23B 45/003 |
| 2020/0214754 | A1* | 7/2020 | Bowen | A61B 17/56 |
| 2021/0240145 | A1* | 8/2021 | Abbott | B23B 51/009 |
| 2021/0283759 | A1* | 9/2021 | Merget | F16P 3/12 |
| 2021/0299843 | A1* | 9/2021 | Abbott | H02K 7/145 |

* cited by examiner

ADAPTABLE MOTOR CONTROL OF MODULAR POWER TOOL

RELATED APPLICATIONS

The present application is based on and claims priority from U.S. Patent Application No. 63/379,934, filed on Oct. 18, 2022, the entire disclosure of which is incorporated herein by reference.

BACKGROUND

Power tools can be used for a variety of purposes such as cutting, drilling, driving, sanding, shaping, grinding, polishing, painting, heating, lighting, cleaning, gardening, and construction, among other uses. Some power tools are modular power tools configured to receive and drive different attachments.

SUMMARY

Some embodiments of the disclosure provide a modular power tool including an electronic controller including a processor and a memory, one or more attachments, a motor communicatively coupled to the electronic controller and configured to drive the one or more attachments, and a sensor communicatively coupled to the electronic controller. The electronic controller is configured to: obtain, via the sensor, one or more indications for the one or more attachments, determine information about a configuration of the one or more attachments based on the one or more indications, and control the motor based on the information about the configuration.

Some embodiments of the disclosure provide a method for adaptable motor control including: obtaining, via a sensor, one or more indications for one or more attachments to a modular power tool, determining an orientation of the one or more attachments based on the one or more indications, and controlling a motor of the modular power tool based on the orientation.

Some embodiments of the disclosure provide a modular power tool including an electronic controller including a processor and a memory, a motor communicatively coupled to the electronic controller, and a sensor communicatively coupled to the electronic controller. The electronic controller is configured to: obtain, via the sensor, axis rotation indications corresponding to more than one axis, determine a combined rotation parameter based on the axis rotation indications, and control the motor based on the rotation sum.

Some embodiments of the disclosure provide a method for motor control including: obtaining, via the sensor, axis rotation indications corresponding to more than one axis, determining a rotation sum based on the axis rotation indications, and controlling the motor based on the rotation sum.

BRIEF DESCRIPTION OF THE DRAWINGS

The accompanying drawings, which are incorporated in and form a part of this specification, illustrate embodiments of the disclosure and, together with the description, explain principles of the embodiments.

DETAILED DESCRIPTION

Some power tools have a modular design and are able to adapt to different needs by a changing of an attachment of the power tool. Additionally, some power tools can include kickback detection and mitigation. However, such kickback detection techniques can be sensitive and specifically designed for tools having a fixed output axis. Accordingly, kickback algorithms for such tools may be inadequate to adjust to interchangeable attachments having different output axes (e.g., offset or angled with respect to a motor axis). The present disclosure provides a modular power tool and methods of motor control for a modular power tool that can obtain or detect a configuration or an orientation of an attachment to the modular power tool and adaptively control the motor based on the configuration or orientation. The present disclosure also provides a modular power tool and methods of motor control for a modular power tool that can detect axial rotations and control the motor of the modular power tool based on a combined rotation parameter or rotation sum of the axial rotations.

Figure 1:
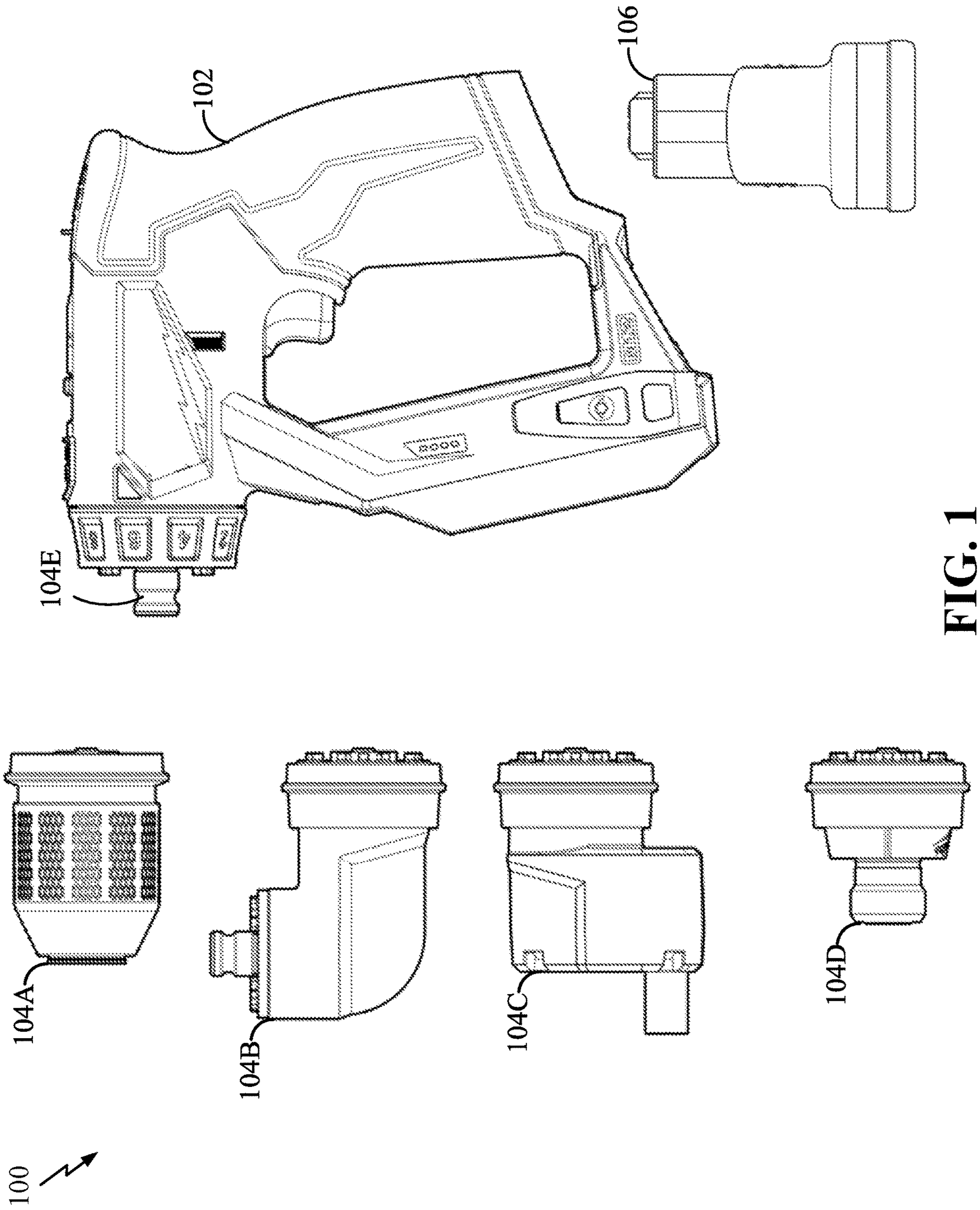
FIG. 1 is an illustration of an example modular power tool with attachments for performing motor control functionality.

FIG. 1 shows an illustration 100 of an example modular power tool 102 that can perform motor control based on an orientation of one or more attachments 104A-104D (generically referred to as an attachment 104 or the attachments 104). Modular power tool 102 as illustrated in FIG. 1 is a motorized power drill-driver; however, in some examples, the modular power tool 102 is of a different type or includes attachments to provide different functionality. For example, the modular power tool 102, with orientation-based motor control functionality, is implemented as a chainsaw, an impact driver, a hammer drill, a pipe cutter, a sander, a nailer, or any other suitable type of power tool in other embodiments. Modular power tool 102 as illustrated in FIG. 1 can receive and attach to one or more attachments 104A-104D. In some examples, one end of attachment 104A-104D can include a spindle or chuck to receive a bit (e.g., a drill bit, a screwdriver bit, etc.) or another attachment 104A-104D. In further examples, the other end of the attachment 104A-104D can include a grip or sleeve to attach attachment 104A-104D to modular power tool 102 or another attachment 104A-104D (e.g., to a spindle of the modular power tool 102 or other attachment 104A-104D).

For example, attachment 104A-104D can include chuck attachment 104A, right angle attachment 104B, offset attachment 104C, hex attachment 104D, or any other suitable attachment. Some attachments can change an orientation of an output axis of modular power tool 102. In further examples, modular power tool 102 can attach multiple attachments 104A-104D in series. For example, a user can attach right angle attachment 104B to change an orientation of the output axis of modular power tool 102 in a right angle and attach another attachment (e.g., chuck attachment 104A, another right angle attachment 104B, offset attachment 104C, hex attachment, or any other suitable attachment) to change an orientation of the output axis and/or to reach a challenging location. It should be appreciated that more than two attachments can be attached to modular power tool 102. In further examples, modular power tool 102 can include a default attachment 104E with a bit holder to hold a bit (or other end effector to hold an implement) without any additional attachment 104. Modular power tool 102 as illustrated in FIG. 1 includes battery pack 106 disposed on the bottom of a handle of power tool 102 and a motor disposed within a housing of modular power tool 102. In some example implementations of modular power tool 102, control of the motor of the modular power tool is based on the changed orientation of the one or more attachments. For example, a kickback event may be detected based in part on a determined orientation of the one or more attachments, and a kickback mitigation involving motor control can then can be used to minimize kickback occurrences or the effects thereof. In other implementations of modular power tool 102, motor control based on the rotation sum of the output axis can minimize kickback occurrences or the effects thereof of modular power tool 102.

Figure 2:
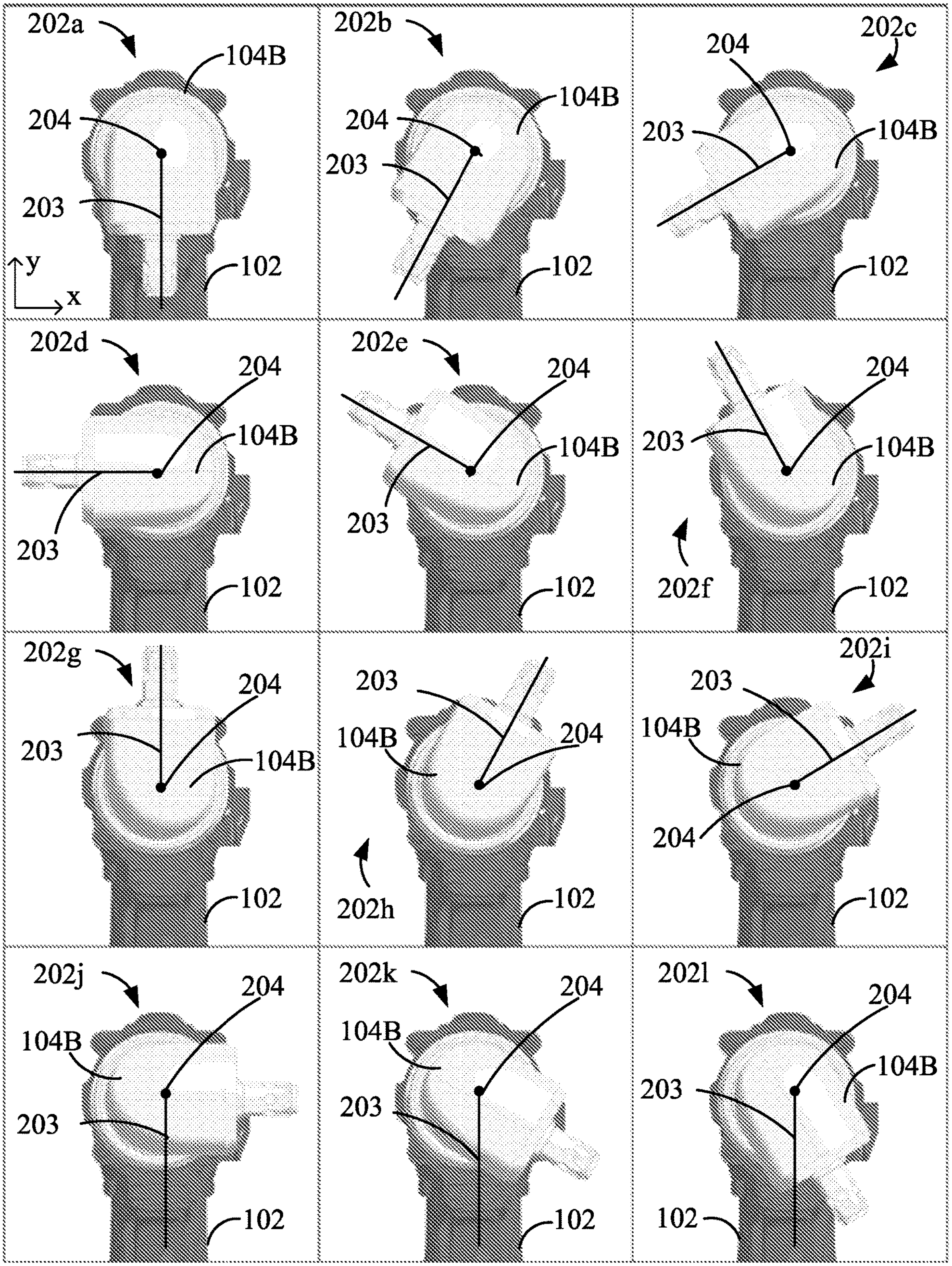
FIG. 2 illustrates different example orientations of an example attachment that can be used for modular power tool.

FIG. 2 illustrates different example orientations of an example attachment that can be used for modular power tool. For example, a user can install or attach right angle attachment 104B in FIG. 1 to modular power tool 102 with an orientation of a predetermined number (e.g., 2, 4, 8, 12, 16, or any suitable number) of orientations. In some scenarios, modular power tool 102 can include a detent or a mechanical means to fix an attachment to an orientation of the attachment. In an example, an orientation of modular power tool 102 can be an output axis of an output attachment with respect to a reference axis (e.g., the output axis of the spindle of modular power tool 102, the axis of battery pack 444 to be connected to modular power tool 102, the axis of the gravity, etc.). In some examples, the output attachment can be an attachment to receive a bit (e.g., a drill bit, a screwdriver bit, etc.). In further examples, the output axis of an attachment (e.g., the output attachment) can include a virtual line on which the attachment is configured to receive a drill bit or a driver bit. In some scenarios, when more than one attachment is attached to modular power tool 102, an attachment receiving a bit is the output attachment while other attachment(s) between the output attachment and modular power tool 102 is/are connecting attachment(s) rather than the output attachment. In an example, the output axis of modular power tool 102 can be an output axis of modular power tool 102 (e.g., an axis of the spindle of default attachment 104E of modular power tool 102) without any attachment to modular power tool. In further examples, some attachments can convert rotary motion to a translation, such as a reciprocating blade attachment that is configured to hold and cause reciprocation of a reciprocating blade.

In some examples as shown in FIG. 2, an attachment of modular power tool 102 can have different orientations 202, individually identified as orientations **202*a*-2021. An orientation of an attachment 104B may include or be associated with, for example, an output axis 203 described based on one or both of an angle of the output axis 203 with respect to a reference point or line of modular power tool 102 (e.g., with respect to a tool output axis 204) and an offset distance between the output axis 203 and the reference point or line. In some examples, the orientation of an attachment may be defined in other ways. For example, right angle attachment 104B attached to modular power tool 102 can have an orientation 202 whose (attachment) output axis 203 can be at a right angle to a tool output axis 204 of modular power tool 102. Although example orientations 202 shown in FIG. 2 include an output axis 203 that is at a right angle with respect to the tool output axis 204 (e.g., which extends along a z axis) of modular power tool 102, right angle attachment 104B can have different orientations 202 based on the direction of the output axis 203 in the x-y plane (e.g., based on the rotational position of right angle attachment 104B attached to modular power tool 102). In some examples, a configuration of an attachment can include an orientation 202*a*-2021 of an attachment 202** and/or information (e.g., type) of the attachment.

It should be appreciated that the example orientations 202 are not limited to the right angle attachment 104B. For example, a user can install or attach offset attachment 104C in FIG. 1 to modular power tool 102 with different orientations. In some scenarios, offset attachment 104C can have different orientations 202 with respect to the output axis 204 of modular power tool 102. For example, different orientations of right angle attachment 104C can have a different output axis 203 (on x-y plane) with respect to the tool output axis 204 of modular power tool 102. Additionally, as previously noted, other attachments 104 or combinations of attachments 104 may coupled to modular power tool 102, which can have further orientations.

Figure 3C:
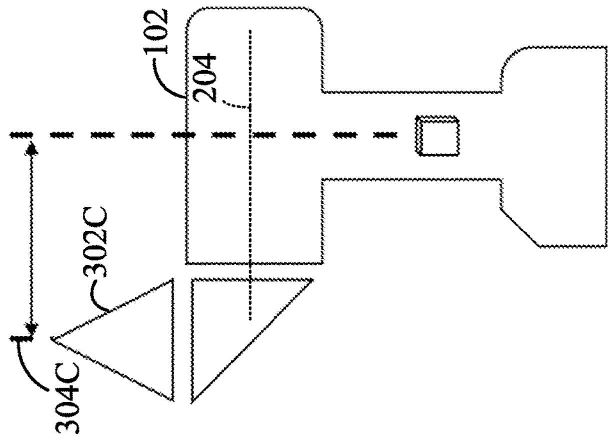
FIGS. 3A-3E illustrate different example orientations with different attachments that can be used for modular power tool.
Figure 3B:
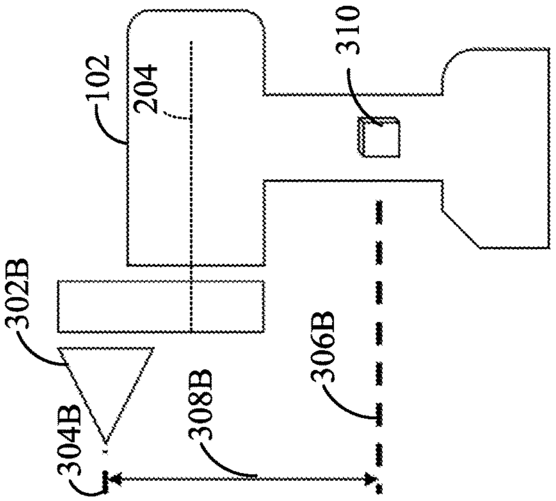
Figure 3E:
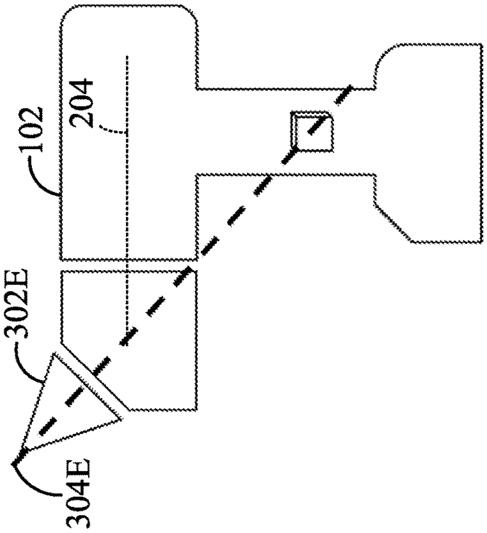
Figure 3A:
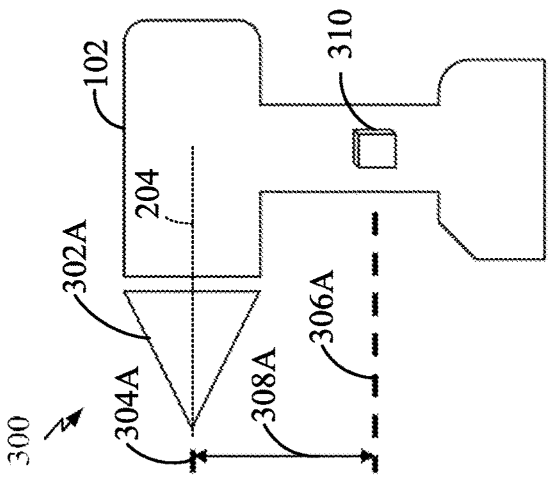
Figure 3D:
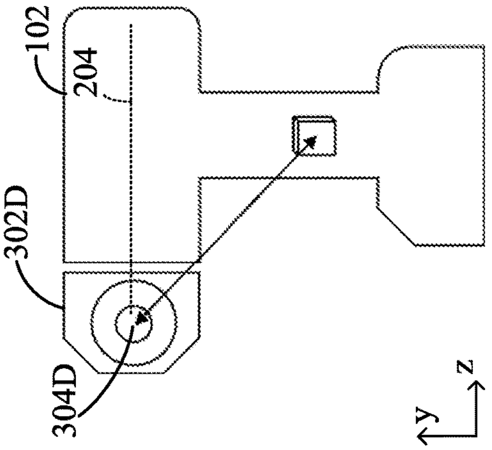

FIGS. 3A-3E illustrate different example orientations with different attachments that can be used for modular power tool 102. In some examples, the orientations of modular power tool 102 can be different for different attachments 302A-302E in FIGS. 3A-3E. For example, in FIG. 3A, a first attachment 302A (e.g., chuck attachment 104A, hex attachment 104D, etc.) attached to modular power tool 102 can have a first orientation 304A coaxial with the output axis 204 of modular power tool 102. In FIG. 3B, a second attachment 302B (e.g., offset attachment 104B, etc.) attached to modular power tool 102 can have a second orientation 304B, which is offset from output axis 204 of modular power tool 102. In FIG. 3C, a third attachment 302C (e.g., right angle attachment 104B, etc.) attached to modular power tool 102 can have a third orientation 304C having an output axis at a right angle relative to output axis 204 of modular power tool 102. In FIG. 3D, a fourth attachment 302D (e.g., right angle attachment 104B attached to modular power tool 102 with a different position, etc.) attached to modular power tool 102 can have a fourth orientation 304D having an output axis in a right angle to the output axis 204 of modular power tool 102 with a different direction of the output axis from the output axis of the third attachment 302C. In some examples, the third orientation 304C (e.g., on y axis) of the third attachment 302C and the fourth orientation 304D of the fourth attachment 302D (e.g., on x axis) can be in a right angle to the output axis 204 (e.g., z axis) of modular power tool 102. In addition, the third orientation 304C (e.g, on y axis) of the third attachment 302C has a different output axis from the fourth orientation 304D (e.g., on x axis) of the fourth attachment 302D. In FIG. 3E, a fifth attachment 302E attached to modular power tool 102 can have a fifth orientation 304E having another output axis different than the output axis 204 of modular power tool 102. For example, the fifth orientation 304E of the fifth attachment 302E can have an axis (e.g., 30°, 45°, 60°, an oblique angle, or any other suitable degrees), which is angled from the output axis of modular power tool 102. In further examples, the fifth attachment 302E can have different orientations as shown in FIG. 2 depending on the positions attached to modular power tool 102.

In even further examples, multiple attachments can be attached to modular power tool 102 in series. For example, the first attachment 302A can be attached to another attachment (e.g., the second attachment 302B, the third attachment 302C, the fourth attachment 302D, or the fifth attachment 302E). Another attachment can be attached between the first attachment 302A and modular power tool 102. In some instances, the first attachment 302A attached to another attachment is the output attachment and can determine an orientation of the modular power tool 102.

Figure 4:
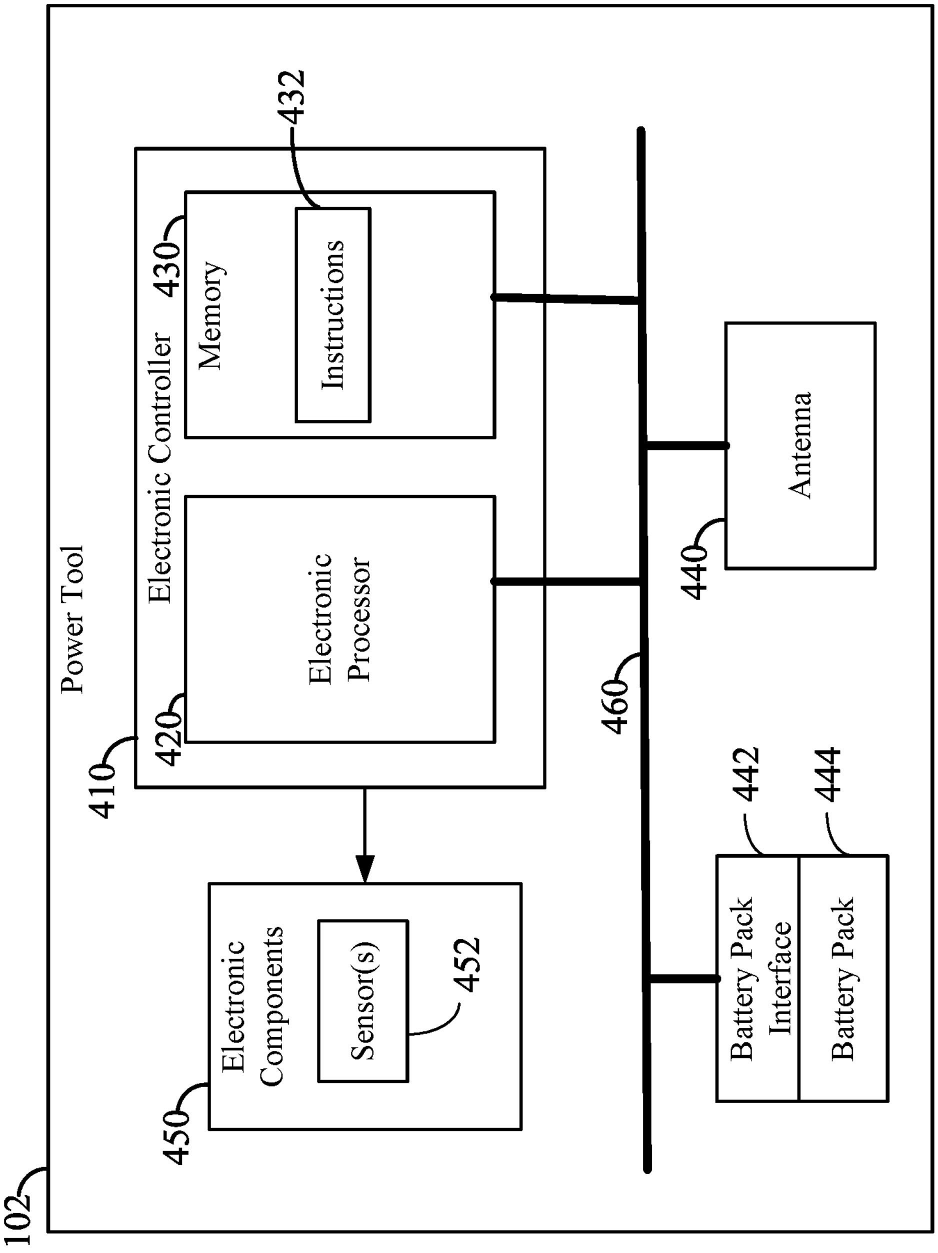
FIG. 4 is a block diagram illustrating example components of the modular power tool of FIGS. 1-3E.

FIG. 4 is a block diagram illustrating example components of modular power tool 102. As shown, power tool 102 includes an electronic controller 410, which includes an electronic processor 420 and memory 430. Modular power tool 102 as shown also includes an antenna 440, a battery pack interface 442, a battery pack 444, a set of electronic components 450, and a communication bus 460. Memory 430 stores instructions 432 that can be executed by electronic processor 420 such that electronic processor 430 implements operations for power tool 102 in accordance with instructions 432. The operations implemented by electronic processor 420 can include sending and receiving data via communication bus 460 and antenna 440, for example. Modular power tool 102 can include additional and/or alternative components for communication and other functionality beyond these example components illustrated in FIG. 4. For example, in some examples, the antenna 440 is not included in modular power tool 102.

Memory 430 can be implemented using any suitable type or types of memory, including read-only memory (ROM), random access memory (RAM), volatile memory, non-volatile, other non-transitory computer-readable media, and/or various combinations thereof. Data stored in memory 430, including instructions 432, can be generated by a wireless device (e.g., a smartphone, a laptop, a tablet, etc.), a server connected to modular power tool 102, other power tools (e.g., at the same job site), or other systems and/or devices. Some of the data stored in memory 430 can be loaded onto power tool 102 at the time of manufacturing, and other data can be stored in memory 430 during the operational lifetime of power tool 102. Electronic processor 420 can be implemented using a variety of different types and/or combinations of processing components and circuitry, including various types of microprocessors, central processing units (CPUs), and the like.

Antenna 440 can be communicatively coupled to electronic controller 410. Antenna 440 can enable electronic controller 410 (and, thus, modular power tool 102) to communicate with other devices, such as with wireless communication devices, one or more servers, and other power tools connected to a network. Antenna 440 can facilitate a communication via Bluetooth, Wi-Fi, and other types of communications protocols. In some examples, antenna 440 can further include a global navigation satellite system (GNSS) receiver of a global positioning system (GPS) that receives signals from satellites, land-based transmitters, and the like.

Battery pack interface 442 can be configured to selectively receive and interface with battery pack 444 (and battery pack 106 shown in FIG. 1) such that battery pack 444 serves as a power source for power tool 102. Battery interface 442 can include one or more power terminals and, in some cases, one or more communication terminals that interface with respective power terminals, communication terminals, etc., of battery pack 444. Battery pack 444 can include one or more battery cells of various chemistries, such as lithium-ion (Li-Ion), nickel cadmium (Ni-Cad), etc. Battery pack 444 can further selectively latch and unlatch (e.g., with a spring-biased latching mechanism) to power tool 102 to prevent unintentional detachment. Battery pack 444 can further include a pack electronic controller (pack controller) including a processor and a memory. The pack controller can be configured similarly to electronic controller 410. The pack controller can be configured to regulate charging and discharging of the battery cells, and/or to communicate with the electronic controller 410. Battery pack 444 can further include an antenna, like antenna 440, coupled to the pack controller via a bus like bus 460. Battery pack 444 can further include a sensor. For example, the sensor in battery pack 444 can assist the electronic controller 410 to determine an orientation of modular power tool 102. Battery pack 444 can be configured to communicate with other devices, such as wireless communication devices or other power tools. Battery pack 444 can communicate battery status information (e.g., percent charged, charging rate, charger connection status, etc.) to electronic controller 410 via battery pack interface 442.

Battery pack 444 can be coupled to and configured to power the various components of modular power tool 102, such electronic controller 410, the antenna 440, and electronic components 450. However, to simplify the illustration, power line connections between the pack 444 and these components are not illustrated. While the example illustration in FIG. 4 shows modular power tool 102 being powered by battery pack 444, it is important to note that different types of power sources can be used to provide power to modular power tool 102. For example, modular power tool 102 could be powered by a wired connection to a power outlet, or other sources of power.

Electronic components 450 can be implemented in a variety of different ways and can include a variety of different components depending on the type of power tool. For example, for a motorized power tool (e.g., drill-driver, saw, etc.), electronic components 450 can include, for example, an inverter bridge, a motor (e.g., brushed or brushless) for driving a tool implement, and the like. Electronic components 450 can also include one or more sensors 452 of one or more types, among other suitable components. The one or more sensors 452 can include an accelerometer, a gyroscope, a depth sensor, a near-field communication (NFC) reader, a radio frequency identification (RFID) reader, an optical sensor, a contact sensor, and/or any other suitable sensor. In some scenarios, a gyroscope produces similar signals for a rotating rigid body when translated, while an accelerometer produces different signals for the rotating rigid body. In this respect, certain sensors will be affected in different ways depending on the configuration of the attachment(s). In some examples, electronic controller 410 can determine information about a configuration of an attachment based on no load currents/loading characteristics, vibration characteristics, slight gyroscopic or reactionary precession motions, grip sensing, motor signal characteristics (ex: current ripples, voltage ripples, speed ripples, etc.), sound information, magnetic sensors (such as hall sensors), capacitive sensing, etc. In some examples, sensor 452 can include sensors typical of any motorized power tool or power tool motor.

In some examples, some sensors of sensors 452 may provide information that an attachment is coupled to power tool 102, but may not provide as much direct information on the specific output axis or orientation of an attachment. For example, for a 90-degree attachment, an axis of symmetry might be experienced and indicated by some sensors. In further examples, power tool 102 and/or attachments 104 can have a limited number of configurations possible (e.g., due to fixed mechanical engagements), which may limit the number of configurations from which a current configuration is identified. As such, the determination of the configuration may be simplified in general and/or upon determining the attachment 104. In other examples, power tool 102 can allow the attachments to have a continuous range of configurations (e.g., such as a full 360 degrees rotation). In some cases, power tool 102 may determine and produce information about the attachment configuration by sensing a characteristic of how the attachment is added, removed, or used recently, and/or a characteristic of how a bit is added, removed, or used. For instance, some attachments can use a push and twist to engage. This engagement can be indicated by sensor data from sensors 452 and identifiable by power tool 102 based on the motion of power tool when the engagement is inserted. As another example, a chuck may have a collar for which a user may free run the chuck (at or near no load) in order to quickly cinch down on a bit. In this case, the motor signals of no load to instant hard loading (among other signals such as motion characteristics) can indicate to power tool 102 that the attachment configuration includes a chuck. In further examples, the sensory information used to detect information about the attachment configuration can be collected when power tool 102 is otherwise not in operation, during a previous operation, and/or collected while power tool 102 is in operation. Furthermore, power tool 102 may not know or have low confidence in the information of the attachment configuration and may use this lack of knowledge to influence a motor control.

In some examples, sensors 452, instructions 432, and/or electronic processor 420 are located or distributed across the battery pack 444, the tool, in a power adapter, an external modular attachment, a wrist watch, a wirelessly connected module (phone, hub for processing) or a physically insertable model. In some examples having multiple sensors 452, each sensor contributes different motion information (for example, two one-axis gyroscopes, with each gyroscope providing information about a different axis of motion).

Figure 5:
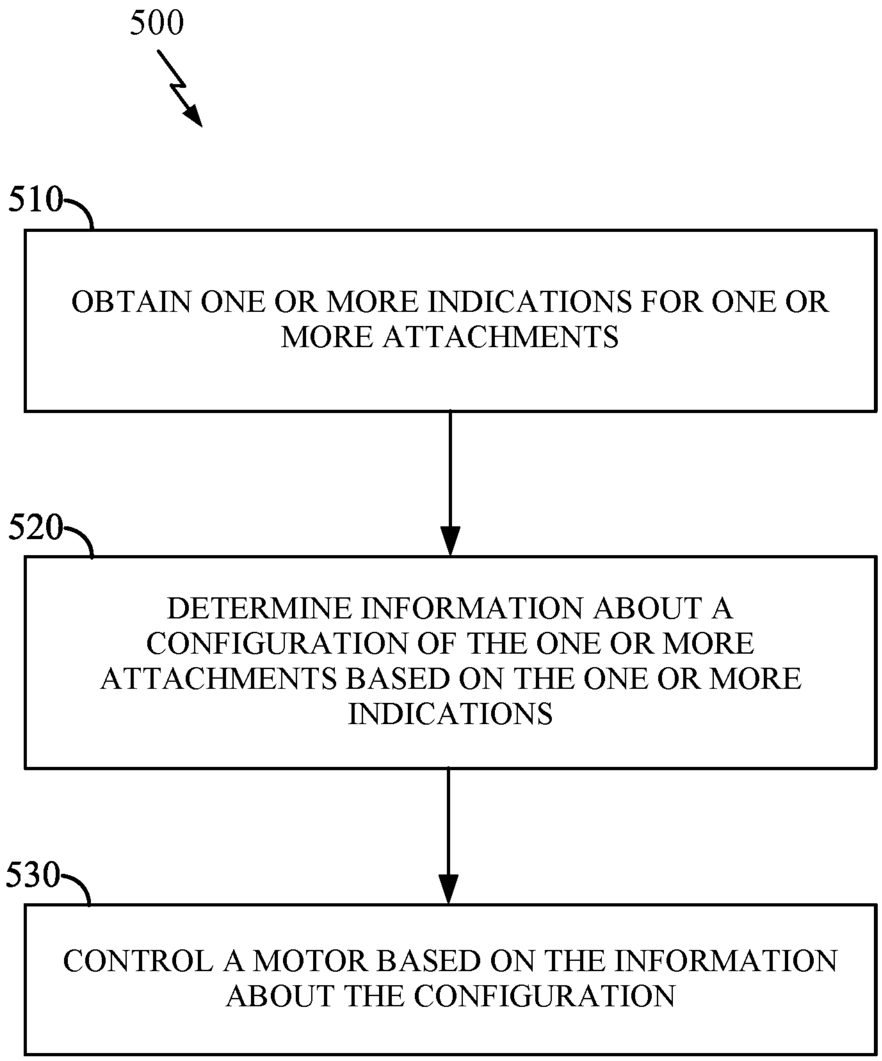
FIG. 5 is a flowchart illustrating an example process for adaptable motor control that can be performed by the example modular power tool of FIGS. 1-3E.

FIG. 5 is a flowchart illustrating an example process for adaptable motor control that can be performed by the example modular power tool of FIGS. 1-4. In some examples, the adaptable motor control of process 500 can be performed based on different orientations shown in FIGS. 2 and 3A-3E. Process 500 generally involves different components of modular power tool 102, including electronic controller 410, and electronic components 450 (e.g., motor and sensor). The ability of modular power tool 102 to perform process 500 (e.g., by processor 420 executing, via electronic controller 410, instructions 432 for performing process 500, where instructions 432 are stored on power tool 102 at the time of manufacturing and/or downloaded to power tool 102 by a user) can provide adaptable motor control (e.g., to prevent kickback) when using modular power tool 102. Process 500 can automatically adjust an algorithm to control the motor of modular power tool 102 based on the one or more attachments to modular power tool 102. Accordingly, process 500 can provide improved versatility of modular power tool 102 and at the same time improve safety functionality due to adaptable motor control. Although the blocks of process 500 are illustrated in a particular order, in some examples, one or more of the blocks of process 500 are executed in parallel, in a different order, or bypassed.

At block 510, modular power tool 102 can obtain one or more indications for or about one or more attachments 104A-104D, 302A-302E. In some examples, the one or more attachments can be attached the modular power tool 102 such that the motor of modular power tool 102, during operation, causes a movement of an attachment (in particular, and output element thereof, such as a spindle, chuck, saw blade, etc.). In some examples, an attachment among the one or more attached attachments is an output attachment configured to receive a bit. In further examples, modular power tool 102 can receive and be attached to multiple attachments 104A-104D (in series) including an output attachment receiving a bit and one or more connecting attachments attached between the output attachment and modular power tool 102.

In some scenarios, modular power tool 102 (e.g., using the electronic controller 410) can obtain the one or more indications from a sensor of modular power tool 102 (e.g., a sensor of the one or more sensors 452). In other words, the indications may be the sensor outputs or inferred from the sensor outputs. In some instances, the sensor can include at least one of: an accelerometer, a gyroscope, a depth sensor, a near-field communication (NFC) reader, a radio frequency identification (RFID) reader, an optical sensor, a contact sensor, or any other suitable sensor that can provide information regarding one or more attachments 104A-104D, 302A-302E attached to modular power tool 102. In some examples, an attachment can include a tag (e.g., an NFC tag, an RFID tag) including or indicating information about the attachment (e.g., an orientation and/or type of attachment), and modular power tool 102 (via a RFID reader of sensors 452) can read the tag in the attachment to obtain the indication. In further examples, the one or more indications can include sensor data from sensor(s) 452 regarding variables such as specific force, angular rate, and/or orientation of modular power tool 102. For example, a sensor (e.g., an inertial measurement unit (IMU), an accelerometer, a gyroscope, or a depth sensor, etc.) of the sensor(s) 452 in modular power tool 102 can provide indications in the form of sensor data (e.g., acceleration, movement, direction, etc.). The sensor data may have different values or signatures in response to a different attachment (or orientation thereof) because an attachment (e.g., output attachment) having a first orientation can result in sensor data indicating a different torque direction or a different rotating direction/force of modular power tool 102 than the attachment (or another attachment) having a second orientation.

In some examples, the one or more indications include a no-load current, a system response, a system efficiency, or a vibration characteristic indicated by sensor data from one or more sensors 452. For example, modular power tool 102 with different attachments can result in different no-load currents when the motor is operated based on battery impedance, different system responses (e.g., time delta between change in current and change in motor speed), different system efficiencies (e.g., change in motor speed divided by change in current), or different vibration characteristics (e.g., vibrations from planetary gearsets). In some examples, modular power tool 102 obtains one or more indications about one or more attachments based on other types of tool motion, gesture recognition with hands tightening, loosening, pulling sleeves, or the like.

In some examples, the one or more indications are in the form of sensor data from one or more sensors 452, for example, an optical sensor, a resistance (or other circuit characteristic) sensor, a capacitance sensor, a grip pressure sensor, and/or a Hall sensor. In some examples, an optical sensor may be positioned to detect a visual identifier (e.g., bar code, unique mark) on an attachment that is attached the module power tool 102 and that identifies the type of attachment and/or orientation. Accordingly, the one or more indications may include an output (sensor data) from the optical sensor indicating the detected visual identifier. In some examples, a resistor or other circuit elements in the one or more attachments may complete a circuit of the modular power tool 102 upon coupling of the attachment(s) to the modular power tool 102. Each attachment type or orientation for the attachment type may have unique or identifiable circuit components that result in a particular resistor (e.g., having a particular resistance) or particular circuit element being coupled the circuit of modular power tool 102. Accordingly, the one or more indications may be the sensed resistance or other circuit characteristic upon the connection occurring with the one or more attachments. Similarly, each attachment may have a unique or identifiable capacitance. Accordingly, the one or more indications may be a sensed capacitance or change in capacitance of modular power tool 102 (or a circuit thereof). In some examples, the one or more indications may include a sensed grip pressure, which may be different for different attachments having different weights and for attachments where the grip pressure may indicate pushing in a given direction indicative of the end effector type or orientation. In some examples, a Hall sensor (or Hall sensors) may be positioned to detect a magnet or magnets uniquely positioned as a magnetic marker(s) on an attachment that is attached the module power tool 102 and that identifies the type of attachment and/or orientation. Accordingly, the one or more indications may include an output (sensor data) from the Hall sensor(s) indicating the detected magnetic marker(s).

In some examples, the one or more indications obtained in block 510 by module power tool 102 includes one or more of the above examples of indications. That is, in some examples, the one or more indications include a combination of different types of sensor data (e.g., visual data from an optical sensor, motion data from an IMU, and current data from a current sensor, or any other combination of the above-described examples. Ultimately, the one or more indications corresponding to the one or more attachments 104A-104D, 302A-302E can be indicative of the types and/or orientations of the one or more attachments 104A-104D, 302A-302E.

At block 520, modular power tool 102 can determine information about a configuration of the one or more attachments based on the one or more indications. For example, the information can be indicative of one or more of a type of the attachment(s), an orientation or output axis of the attachment(s), an operation or function of the attachment(s) (e.g., rotation, oscillation, translation, reciprocation, etc.), or the like. This information can be used to by the power tool 102 to distinguish, for example, between different attachment types that have the same output axis, the same attachment types that have different output axis. As an example, some attachments may have the same output axis (e.g., a ¼" bit holder vs. a larger chuck), but can cause a gear ratio change in the power tool 102. These attachments may therefore still be determined by the power tool 102 to have different configurations, due to different types of the one or more attachments, despite the similar output axis.

As noted, the information about the configuration can additionally or alternatively include an indication of an orientation of the one or more attachments. In some examples, the electronic controller 410 may determine an orientation of the one or more attachments based identifying the type of attachment(s). For example, some attachments (e.g., attachments 104A and 104D) may have a single orientation, such as having an output axis co-axial with a motor axis of modular power tool 102. Accordingly, by identifying the attachment type being of a particular type, which may be associated with the orientation of the attachment type (e.g., in a table or mapping in memory 430) the electronic controller 410 may determine the orientation, for example, by accessing the memory 430 with the identity of the attachment type to retrieve the orientation. The electronic controller 410 may identify the type of attachment based on the indication using various techniques. For example, in some scenarios, the indications provide a direct identification of the attachment type (e.g., an RFID tag of the attachment may store an identifier that represents or is mapped to an attachment type in memory 430). In other scenarios, the electronic controller 410 compares the indication(s) obtained in the form of sensor data to one or more thresholds or signatures that are defined and associated with a particular attachment type. Accordingly, when the electronic controller 410 determines that the sensor data (e.g., no-load current data, system response, system efficiencies, vibration, tool motion, recognized gesture, RFID tag data, optical data, contact data, etc.) matches a signature or falls within a certain predefined range associated with a particular attachment type, the electronic controller 410 identifies the attachment as being of the particular attachment type.

In some examples, when the one or more attachment may have multiple orientations, electronic controller 410 uses the identified type of attachment to first limit the potential orientations, and then analyzes the indications (e.g., sensor data) further (e.g., using one of the below-described techniques) to identify which of the potential orientations is the actual orientation for the one or more attachments. In still further examples, electronic controller 410 determines the orientation of the one or more attachments without identifying the attachment type (e.g., using one of the below-described techniques).

In some examples, to determine the information about the configuration based on the one or more indications, modular power tool 102 can determine, based on the one or more indications, a movement of an attachment of the one or more attachments. In some examples, the attachment can be an output attachment that receives a bit. In some scenarios, to determine the information about the configuration (e.g., orientation) based on the one or more indications, modular power tool 102 can further determine an output axis of the attachment and a distance of the attachment (e.g., from a reference point) based on the movement. For example, the output axis of the attachment (e.g., axis 203 in FIG. 2) can include a virtual line on which the attachment is configured to receive a bit (e.g., a drill, a driver bit, etc.). In some scenarios, the distance of the attachment is from the output axis of the attachment to the electronic controller or a sensor (e.g., IMU) of sensors 452 at a right angle to the output axis. However, it should be appreciated that the distance is not limited to the distance from the output axis to the electronic controller or sensor of modular power tool 102. Modular power tool 102 can measure the distance from the output attachment to battery pack 444 or any other predetermined location on or near modular power tool 102. In some examples, the electronic controller 410 determines the distance between the output axis of the attachment and a reference point of modular power tool 102 based on the determined attachment type and direction of the output axis of the attachment in combination with known dimensions of the attachment and modular power tool 102.

In a further scenario, to determine the information about the configuration (e.g., orientation) based on the one or more indications, modular power tool 102 can determine the information about the configuration (e.g., orientation) of the attachment based on the output axis and/or the distance. When modular power tool 102 is operating, a rotating force on an attachment (e.g., an output attachment) of one or more attachments can generate a unique movement of modular power tool 102. For example, the movements of modular power tool 102 with chuck attachment 104A, right angle attachment 104B, and chuck attachment 104A along with a right angle attachment 104B can be different from one another. In addition, modular power tool 102 can use a distance between an attachment (e.g., the spindle of the attachment, the output axis of the attachment, etc.) and a measuring location (e.g., the electronic controller 410, the battery 444, or a sensor of the sensor(s) 452) to determine the orientation of the attachment. Referring to FIG. 3A, modular power tool 102 can determine a first distance 308A from an output axis 304A of a first attachment 302A (e.g., an output attachment) of the one or more attachments to the electronic controller 410 at a right angle to the output axis 304A. Referring to FIG. 3B, modular power tool 102 can determine a second distance 308B from an output axis 304B of a second attachment 302B (e.g., an output attachment) of the one or more attachments to the electronic controller 410 at a right angle to the output axis 304B. Since the first and second distances 308A, 308B for the first and second attachments, respectively, are different, modular power tool 102 can use the distance 308A, 308B to determine orientations of attachments 302A, 302B for different attachments. In other examples, to determine the orientation based on the one or more indications, modular power tool 102 can obtain sensor data indicative of the orientation of an attachment of the one or more attachments. For example, the attachment can include a sensor (e.g., an IMU) to detect the orientation of the attachment. As part of the indications obtained in block 510, modular power tool 102 can obtain, from the sensor in the attachment, sensor data including the orientation of the attachment. In some examples, an (absolute) orientation of the attachment (indicated by an IMU in the attachment) can be compared to an (absolute) orientation of the modular power tool 102 (indicated by an IMU in the tool) to determine a relative orientation of the attachment with respect to the modular power tool 102.

In further examples, modular power tool 102 can determine information about a configuration (e.g., orientation) of an attachment further based on the output axis of the attachment relative to the gravity. For example, chuck attachment 104A attached to modular power tool 102 can have a first orientation (e.g., a horizontal orientation) when the modular power tool 102 is operating with an output axis of chuck attachment 104A substantially at a right angle with respect to the gravity. In another example, chuck attachment 104A attached to modular power tool 102 can have a second orientation (e.g., a vertically upward orientation) when the modular power tool 102 is operating with the output axis of chuck attachment 104A substantially at 180 degrees with respect to the gravity. In another example, chuck attachment 104A attached to modular power tool 102 can have a third orientation (e.g., a vertically downward orientation) when the modular power tool 102 is operating with the output axis of chuck attachment 104A substantially at 0 degrees with respect to the gravity. In some scenarios, modular power tool 102 can determine that the first, second, and third orientations are different (absolute) orientations of the one or more attachments (despite the one or more attachments having the same relative orientation relative to the modular power tool 102).

In some examples, modular power tool 102 can determine information about a configuration (e.g., orientation) of the attachment based on one or more indications described above as in the form of sensor data from an optical sensor, a resistance (or other circuit characteristic) sensor, a capacitance sensor, or a grip pressure sensor. For example, the electronic controller 410 may determine, based on a visual identifier indicated by the optical sensor, the type of attachment and/or orientation. For example, the visual identifier may be positioned on the attachment(s) to be sensed and detected by the optical sensor when in a particular orientation. The visual identifiers may be mapped (e.g., in memory 43) to a particular orientation and, in some instances, a particular attachment type. Accordingly, the electronic controller 410 may access memory 430 with the visual identifier to determine the associated attachment orientation and, in some instances, attachment type. Similarly, in the case of a resistance sensor or other circuit characteristic sensor, the electronic controller 410 may determine the orientation and, in some instances, the attachment type based on the sensor data by accessing a mapping of such sensor data to particular orientations and/or attachment types in memory 430. Similarly, in the case of a capacitance sensor, the electronic controller 410 may determine the orientation and, in some instances, the attachment type based on the sensor data by accessing a mapping of such sensor data to particular orientations and/or attachment types in memory 430. Similarly, in the case of a grip pressure sensor, the electronic controller 410 may determine the orientation and, in some instances, the attachment type based on the sensor data by accessing a mapping of such sensor data to particular orientations and/or attachment types in memory 430.

At block 530, modular power tool 102 can control the motor based on the information about the configuration. In some examples, controlling the motor based on the configuration includes modular power tool 102 detecting a kickback occurrence based on the configuration and then, in response, initiating a kickback mitigation. For example, electronic controller 410 may detect a kickback occurrence based on sensor data from a sensor of sensor(s) 452 and a kickback detection algorithm configured based on the configuration determined in block 520 (as described further below). Electronic controller 410 may initiate kickback mitigation by reducing a current to the motor. In some examples, in addition to or instead of configuring the kickback detection algorithm based on the configuration determined in block 520, the kickback mitigation is configured based on the configuration (as described further below). In some examples, in addition to or instead of kickback-based control that is based on the configuration, other aspects controlling the motor are based on the configuration.

Kickback Control Based on Attachment Configuration

To detect kickback, modular power tool 102 may implement various kickback detection algorithms and use various parameters with these algorithms. In some scenarios, the electronic controller 410 detects a kickback occurrence when the electronic controller 410 determines, from sensor data from sensor(s) 452, that one or more monitored power tool characteristics (e.g., the motor current, the angular velocity of the spindle of the attachment, etc.) reach one or more corresponding kickback thresholds. For example, modular power tool 102 can determine a kickback occurrence when the motor current has decreased below a low current threshold and the angular velocity of the tool body (e.g., an end of a handle of modular tool 102 or another reference point of or within a housing of modular tool 102) exceeds a rotation speed threshold. Additionally, the modular power toll 102 can determine a kickback occurrence when angular acceleration of the tool body exceeds an acceleration threshold, or based on another monitored power tool characteristic exceeds a threshold. For example, the monitored power tool characteristic can include an acceleration and/or a movement distance of a handle. Thus, modular power tool 102 can determine a kickback occurrence when the handle of modular power tool 102 moves more than a threshold distance within a predetermine time.

In some examples, each configuration (e.g., orientation) of a plurality of potential configurations of the one or more attachments, including the configuration detected in block 510, may be associated (e.g., in memory 430) with a particular kickback detection algorithm of a plurality of kickback detection algorithms of modular power tool 102. Accordingly, in some examples of block 520 in which kickback control is based on the configuration, the electronic controller 410 selects (e.g., from memory 430) the kickback detection algorithm to be employed during operation of modular power tool 102 based on the configuration. In some examples, each configuration of a plurality of potential configurations of the one or more attachments, including the configuration detected in block 510, may be associated (e.g., in memory 430) with a particular threshold or thresholds of a plurality of thresholds that define the sensitivity of a kickback detection algorithm and/or an expected direction of kickback. For example, kickback for module power tool 102 having a configuration (e.g., orientation) as shown in FIG. 3A would be expected to occur and include rotation about the z-axis (that extends left-to-right in FIG. 3A), whereas kickback for modular power tool 102 having a configuration (e.g., orientation) as shown in FIG. 3D would be expected to occur and include rotation about the x-axis (that extends in/out of the page in FIG. 3D). Accordingly, the relevant rotational thresholds may vary for these two configurations. Accordingly, in some examples of block 520 in which kickback control is based on the configuration, the electronic controller 410 selects (e.g., from memory 430) the one or more thresholds to be employed during operation of modular power tool 102 based on the configuration. In some examples, each configuration of a plurality of potential configurations of the one or more attachments, including the configuration detected in block 510, may be associated (e.g., in memory 430) with a particular sensitivity of a plurality of sensitivities that define the sensitivity of a kickback detection algorithm through an association with one or more thresholds or kickback detection algorithms. Accordingly, in some examples of block 520 in which kickback control is based on the configuration, the electronic controller 410 selects (e.g., from memory 430) a kickback detection algorithm and/or one or more thresholds, associated with the sensitivity, to be employed during operation of modular power tool 102 based on the configuration. In some examples, one or more kickback detection algorithms include additional parameters specific to particular attachment types or orientations, such as an output axis angle (e.g., angle of the output axis of the attachment with respect to a reference point) or a distance measure (e.g., a distance from the output axis of the attachment with respect to a reference point). The particular algorithms, thresholds, and sensitives associated with each orientation in modular power tool 102 may be identified and predetermined through testing.

In some examples, modular power tool 102 determines a kickback mitigation, to be employed in the event of a kickback occurrence, based on the configuration. In some examples, each configuration of a plurality of potential configuration s of the one or more attachments, including the configuration detected in block 510, may be associated (e.g., in memory 430) with a particular mitigation technique of a plurality of mitigation techniques having different mitigation aggressiveness levels. For example, each mitigation technique may be associated with a different current reduction or limit amount, where the more aggressive a mitigation technique, the more current to the motor is reduced or limited. In some examples, attachments with potential for larger kickback torque (e.g., tools with larger bit or chuck diameters) may have more aggressive kickback mitigation than attachments likely to produce lower kickback torque.

In some examples, modular power tool 102 may also detect the presence or absence of a side handle on modular power tool 102 and configure the kickback detection algorithm and/or kickback mitigation further based on this side handle information as well. For example, a kickback detection algorithm may be selected of configured to be less sensitive (using similar techniques as described above), and/or a kickback mitigation technique may be selected that is less aggressive (using similar techniques as described above), when the electronic controller 410 detects presence of a side handle, which can provide a user with additional stability and control of modular power tool 102. Electronic controller 410 may detect presence of a side handle with a capacitive sensor, proximity sensor, resistance sensor, or the like positioned near at attachment point for the side handle on modular power tool 102.

In some examples, kickback detection and mitigation may be disabled based on the configuration determined in block 520. For example, it may be desirable for modular power tool 102 to not implement kickback mitigation for certain attachments or configurations. Accordingly, in such examples, control of the motor based on the configuration (in block 530) includes disabling kickback detection and mitigation.

Other Motor Control Based on Attachment Configuration.

In some examples, to control the motor based on the configuration in block 530, modular power tool 102 can control at least one of: a maximum power of the motor, a torque of the motor, a maximum speed of the motor, other motor speed control characteristics (e.g., PID control parameters for motor control), motor speed ramp up characteristics (e.g., rate of increase, time delays, etc.), and/or modified motor braking characteristics (e.g., braking rate, time delays, etc.) based on the determined information about the configuration. For example, modular power tool 102 can use a different maximum threshold (e.g., the power of the motor, the torque of the motor, a speed of the motor) based on the different orientation of the attachment. In some examples, electronic controller 410 may access a mapping of such maximum threshold(s) to orientations in memory 430 using the orientation determined in block 520 and obtain from the mapping the associated maximum threshold(s) from memory 430. Electronic controller 410 may then operate modular power tool 102 (e.g., the motor) to drive attachments using these maximum threshold(s). For example, electronic controller 410 may limit current to the motor when one of these maximum threshold(s) is reached. This configuration-based motor control enables modular power tool 102 to adapt to the particular inertia of the modular power tool 102 resulting from an attachment, which can vary significantly from attachment to attachment. For example, an attachment may include a planetary or spur gearbox to change the output torque (in some cases, significantly) relative to another attachment without such a gearbox. Depending on the attachment received, modular power tool 102 may have significantly different inertia. However, in block 530, the implemented motor control (e.g., a power control, a speed control, a torque control, etc.) can be adapted to an optimal or more desirable control scheme for each particular attachment based on the information about the configuration.

In some examples, to control the motor based on the orientation or information about the tool configuration in block 530, modular power tool 102 initiates a mitigation to reduce a current to the motor responsive to electronic controller determining that the orientation determined in block 520 indicates that the output axis is not parallel or right-angled to a ground surface (within a certain tolerance, e.g., 5%, 10%, 25%).

In some scenarios, in block 530, modular power tool 102 can further change e-clutch setting based on the orientation or information about the tool configuration. For example, each orientation of a plurality of potential orientations may be associated with a maximum e-clutch setting of a plurality of available e-clutch settings (e.g., each of which may include a current threshold indicating when the motor should stop driving an output). Accordingly, electronic controller 410 may adjust the currently selected e-clutch setting to the maximum permitted e-clutch setting associated with the orientation detected in block 520.

In some scenarios, in block 530, modular power tool 102 can modify other tool settings (e.g., hardware over-current limits, dynamic commutation settings, field weakening settings, soft-start profile, motor speed profile, motor response settings, etc.) based on the orientation or the attachment. In further scenarios, modular power tool 102 can change a tool mode (e.g., a right-angle attachment mode to disable a Tek® screw operation) of modular power tool 102 based on the orientation or the attachment.

In some scenarios, in block 530, special modes may be employed by modular power tool 102 that utilize information of the attachment configuration. For instance, a screw seating mode of modular power tool 102 may set the output to rotate a fixed number of degrees to achieve screw seating, and then cease motor rotation (e.g., until a trigger release and further trigger pull). As different attachments may change the overall output gear ratio (and, thus, degrees of rotation of a bit per degrees of rotation of the motor), the information on the configuration can be used to set the output rotation amount. In some examples, modular power tool 102 may also compensate for any tool body rotation (sensed by sensors 452) during the screw seating mode, for example, when the desire is to control the output in the ground reference frame.

In even further examples, modular power tool 102 can control the motor further based on other information (e.g., handles, grip, etc.). For example, when a user attaches a side-handle on modular power tool 102, modular power tool 102 can adjust the motor control algorithm (e.g., increasing a kickback threshold or a maximum torque threshold, etc.) because the user can control more power on modular power tool 102 with the side-handle. In some scenarios, modular power tool 102 can enable or disable leveling features based on the orientation or the attachment. For example, some drills can have a leveling feature. This may be a display that helps a user keep a tool level during operation (or at a specific orientation) or it may be an electronic leveling system (ex: an accelerometer) that changes [ex: stops] tool operation if the tool is not level. However, modular power tool 102 can disable, enable, or modify the leveling feature based on the orientation or the attachment. For example, right angle attachment 104C may use a different direction of drilling which is different from horizontal drilling of chuck attachment 104A.

In even further examples, based on the orientation or the attachment, modular power tool 102 can use a depth sensor (e.g., an infrared sensor, an ultrasonic distance sensor, etc.) to compensate for attachment features (e.g., offset, angle, etc.). In further examples, modular power tool 102 can automatically control the motor or allow a user to activate or deactivate the motor control. In further examples, modular power tool 102 can deactivate the motor when more than predetermined number of attachments are attached to modular power tool 102 or a combination of multiple attachments is not permitted.

In some examples of the motor control discussed above, whether kickback control or other motor control examples, instead of determining an attachment orientation and basing the control on the attachment orientation, electronic controller 410 determines an attachment type (in block 520), for example, using one of the above-described techniques, and controls the motor based on the attachment type (in block 530), using similar principles as described above.

Figure 6:
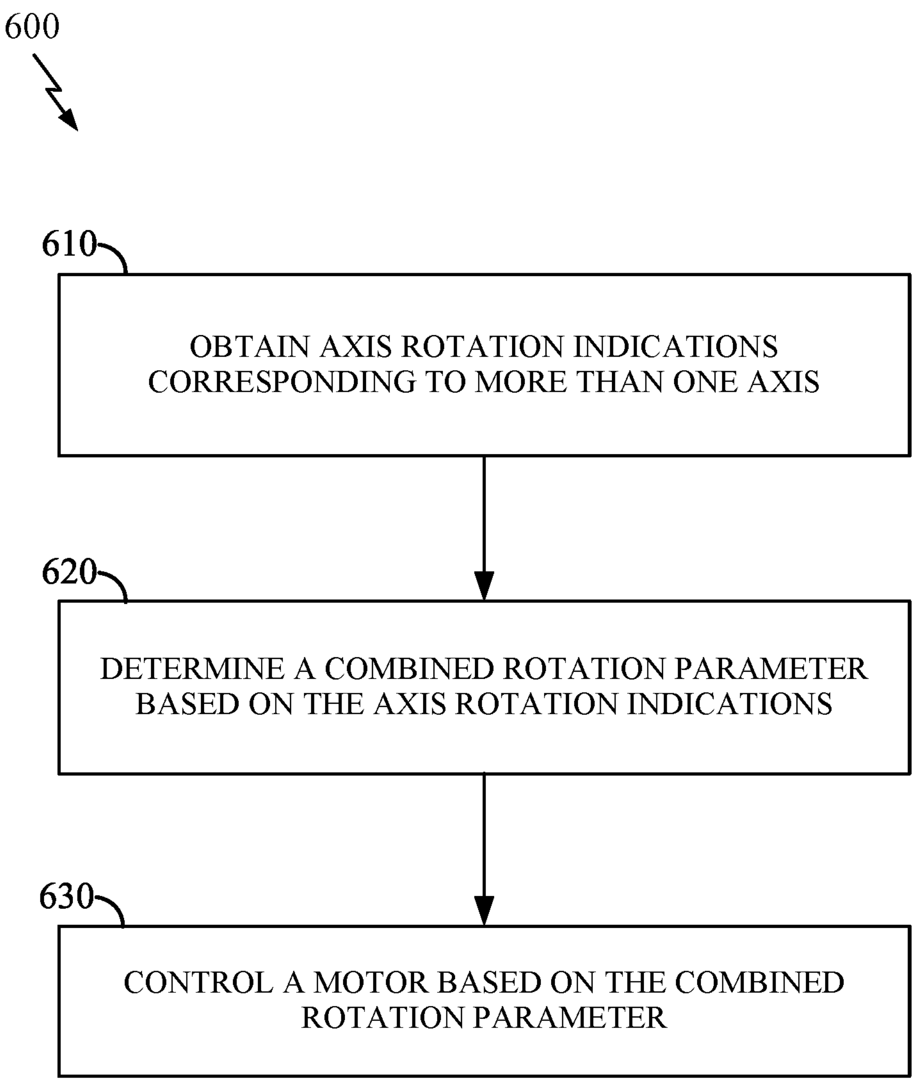
FIG. 6 is a flowchart illustrating another example process for motor control that can be performed by modular power tool of FIG. 1-3E.

FIG. 6 is a flowchart illustrating an example process for adaptable motor control that can be performed by the example modular power tool of FIGS. 1-4. In some examples, the motor control of process 600 can be performed based on axis rotation indications. Process 600 generally involves different components of modular power tool 102, including electronic controller 410, and electronic components (e.g., motor and sensor). The ability of modular power tool 102 to perform process 600 (e.g., by processor 420 executing instructions 432 for performing process 600, where instructions 432 are stored on power tool 102 at the time of manufacturing and/or downloaded to power tool 102 by a user) can provide motor control to prevent or mitigate kickback occurrences when using modular power tool 102. Process 600 can control the motor of modular power tool 102 based on the rotational sum regardless of an orientation of modular power tool 102. Although the blocks of process 600 are illustrated in a particular order, in some examples, one or more of the blocks of process 600 are executed in parallel, in a different order, or bypassed.

At block 610, modular power tool 102 can obtain axis rotation indications corresponding to more than one axis. For example, modular power tool 102 can use a rotational sensing (e.g., an IMU) that outputs rotation data for multiple axes of rotation. For example, electronic controller 410 can receive rotational readings or indications (e.g., X, Y, and Z) along the x, y, and z axis data using a gyroscope, accelerometer, or both. It should be appreciated that modular power tool 102 can obtain axis rotation indications using any other suitable sensor (e.g., geomagnetic rotation vector sensor).

At block 620, modular power tool 102 can determine a combined rotation parameter based on the axis rotation indications. In some examples, the combined rotation parameter includes a rotation sum. In some examples, electronic controller 410 can calculate the rotation sum based on absolute values of rotational indications. For examples, the rotation sum can be expressed as: $|X|+|Y|+|Z|$ or a $\sqrt{X^2+Y^2+Z^2}$. In other examples, the combined rotation parameter can include: Max (|X|, |Y|, |Z|) or other norms. In other examples, the combined rotation parameter can include another form. For example, the combine rotation parameter can include: $(1+\text{alpha}\times|X|)\times(1+\text{beta}\times|Y|)\times(1+\text{gamma}\times|Z|)$, Max (f(X), g(Y), h(Z)), Average (f(X), g(Y), h(Z)) Sum (f(X), g(Y), h(Z)), i(f(X), g(Y), h(Z)), etc. Here, f(X), g(Y), h(Z)) may be raw magnitude values, or may be leaky angle accumulators or other IIR or FIR functions (i.e., not just based on a raw magnitude). In further examples, the rotational sum as the combined rotation parameter can involve two of three parameters and/or have more inputs (e.g., a parameter for current, speed, etc.).

At block 630, modular power tool 102 can control a motor of modular power tool 102 based the rotation sum. For example, electronic controller 410 can detect a kickback occurrence in response to the rotation sum exceeding a threshold. In some examples, the rotation sum is for a predetermined amount of time, thus indicating a rotational velocity exceeding a threshold. In some examples, the rotation such is a rotational acceleration and the threshold is an acceleration threshold. In still further examples, electronic controller 410 also determines whether additional conditions are satisfied based on other parameters before concluding a kickback occurrence is present (e.g., current being above or below a certain threshold). Then, in response to detecting the kickback occurrence, electronic controller 410 can initiate a kickback mitigation to reduce a current to the motor. For example, electronic controller 410 may initiate a kickback mitigation, as described above, to limit or reduce motor current. By using the rotational sum to detect kickback, the kickback detection algorithm (and motor control) may be agnostic to a particular attachment orientation.

In some examples of the process 600, instead of or in place of determining a rotation sum in block 620, electronic controller 410 executes multiple kickback detection algorithms in parallel, each algorithm associated with a different axis. For example, in some examples, electronic controller 410 executes a first kickback detection algorithm to detect a kickback occurrence indicating rotation about an x-axis of modular power tool 102, executes a second kickback detection algorithm to detect a kickback occurrence indicating rotation about a y-axis of modular power tool 102, executes a third kickback detection algorithm to detect a kickback occurrence indicating rotation about a z-axis of modular power tool 102. In the event that electronic controller 410 detects a kickback occurrence about any of these axes using one of the algorithms, electronic controller 410 proceeds to a modified block 630 and initiates a kickback mitigation (e.g., to reduce or limit motor current, as described above). Accordingly, regardless of the attachment orientation and resulting axis of rotation that a potential kickback occurrence could cause, electronic controller 410 may detect the kickback occurrence with at last one of the parallel executing kickback detection algorithms.

In some examples, modular power tool 102 can include not only a rotary output but also multi-headed power tools (e.g., pole saw, trimmer, edger, etc.) where a protective feature (whether for bind-up, kickback, loss-of-control, etc.) may take other forms. Some multi-headed power tools include cutting tools such as reciprocating saw attachments for which loss-of-control and blade binding take different forms. In further examples, modular power tool 102 uses the information about a configuration (from block 520) or combined rotational parameter (from block 620) to detect a tool falling condition (e.g., when a tool is dropped by a user, bumped off of a ledge, etc.). Typical trajectories and fall characteristics (rotational motions) are dependent on the attachments of such a modular power tool. As an example, a long pole saw can rotate faster about its long axis than the other orientations. It should be appreciated that utilization of modular power tool 102 and its control algorithm are not limited to the examples described above.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature can sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions can be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

FURTHER EXAMPLES

Example 1: A modular power tool for adaptable motor control, method for adaptable motor control, and/or computer readable medium storing instructions to cause an electronic controller to perform adaptable motor control, comprising: obtaining, via a sensor, one or more indications for one or more attachments to a modular power tool; determining information about a configuration of the one or more attachments based on the one or more indications; and controlling a motor of the modular power tool based on the information about the configuration.

Example 2: The tool, method, and/or computer readable medium of Example 1, wherein the configuration comprises an orientation of the one or more attachments.

Example 3: The tool, method, and/or computer readable medium of Example 1 or 2, wherein, determining the configuration comprises: determining, based on the one or more indications, a movement of an attachment of the one or more attachments; determining an output axis of the attachment and a distance of the attachment based on the movement; and determining the configuration of the attachment based on the output axis and the distance.

Example 4: The tool, method, and/or computer readable medium of any of Examples 1 to 3, wherein the sensor comprises at least one selected from a group of an accelerometer, a gyroscope, and a depth sensor.

Example 5: The tool, method, and/or computer readable medium of any of Examples 1 to 4, further comprising: measuring at least one selected from a group of a no-load current, a system response, a system efficiency, and a vibration characteristic for detecting the attachment.

Example 6: The tool, method, and/or computer readable medium of any of Examples 1 to 5, wherein the attachment is configured to receive a drill bit or a driver bit.

Example 7: The tool, method, and/or computer readable medium of any of Examples 1 to 6, wherein the one or more attachments is attached to the modular power tool such that the motor causes the movement of the attachment.

Example 8: The tool, method, and/or computer readable medium of any of Examples 1 to 7, wherein the output axis of the attachment comprises a virtual line on which the attachment is configured to receive a drill bit or a driver bit.

Example 9: The tool, method, and/or computer readable medium of any of Examples 1 to 8, wherein the distance of the attachment is from the output axis of the attachment to the electronic controller in a right angle to the output axis.

Example 10: The tool, method, and/or computer readable medium of any of Examples 1 to 9, wherein controlling the motor comprises: detecting, via the sensor, the output axis not being parallel or right-angled to a ground surface; and in response to the output axis not being parallel or right-angled to a ground surface, initiating a mitigation to reduce a current to the motor.

Example 11: The tool, method, and/or computer readable medium of any of Examples 1 to 10, wherein, controlling the motor based on the configuration comprises: detecting, via the sensor, a kickback occurrence based on the information about the configuration; and in response to detecting the kickback occurrence, initiating a kickback mitigation to reduce a current to the motor.

Example 12: The tool, method, and/or computer readable medium of any of Examples 1 to 11, wherein controlling the motor comprises: controlling at least one selected from a group of a maximum power of the motor, a torque of the motor, and a maximum speed of the motor based on the information about the configuration.

Example 13: The tool, method, and/or computer readable medium of any of Examples 1 to 12, wherein, determining the information about the configuration based on the one or more indications comprises: obtaining sensor data indicative of the configuration of an attachment of the one or more attachments.

Example 14: The tool, method, and/or computer readable medium of any of Examples 1 to 13, wherein the sensor comprises at least one selected from a group of a near-field communication (NFC) reader, a radio frequency identification (RFID) reader, an optical sensor, and a contact sensor.

Example 15: The tool, method, and/or computer readable medium of any of Examples 1 to 14, wherein the attachment is configured to receive a drill bit or a driver bit.

Example 16: The tool, method, and/or computer readable medium of any of Examples 1 to 15, wherein the one or more attachments is attached to the modular power tool such that the motor causes a movement of the attachment of the one or more attachments.

Example 17: The tool, method, and/or computer readable medium of any of Examples 1 to 16, wherein the configuration of the attachment defines an output axis of the attachment, the output axis comprising a line on which the attachment is configured to receive a drill bit or a driver bit.

Example 18: The tool, method, and/or computer readable medium of any of Examples 1 to 17, wherein controlling the motor based on the information about the configuration comprises: detecting, via the sensor, a kickback occurrence based on the information about the configuration; and in response to detecting the kickback occurrence, initiating a kickback mitigation to reduce a current to the motor.

Example 19: The tool, method, and/or computer readable medium of any of Examples 1 to 18, wherein controlling the motor comprises: controlling at least one selected from a group of a maximum power of the motor, a torque of the motor, and a maximum speed of the motor based on the information about the configuration.

Example 20: A modular power tool for adaptable motor control, method for adaptable motor control, and/or computer readable medium storing instructions to cause an electronic controller to perform adaptable motor control, comprising, comprising: obtaining, via a sensor, axis rotation indications corresponding to more than one axis; determining a combined rotation parameter based on the axis rotation indications; and controlling a motor based on the combined rotation parameter.

Example 21: The tool, method, and/or computer readable medium of Example 20, wherein controlling the motor comprises: detecting a kickback occurrence in response to the combined rotation parameter exceeding a threshold; and in response to detecting the kickback occurrence, initiating a kickback mitigation to reduce a current to the motor.

Various features and advantages of the disclosure are set forth in the following claims.

The invention claimed is:

1. A modular power tool for adaptable motor control, comprising:
- an electronic controller including a processor and a memory;
- one or more attachments;
- a motor communicatively coupled to the electronic controller and configured to drive the one or more attachments; and
- a sensor communicatively coupled to the electronic controller;
- wherein the electronic controller is configured to:
  - obtain, via the sensor, one or more indications for the one or more attachments;
  - determine, based on the one or more indications, a movement of an attachment of the one or more attachments;
  - determine an output axis of the attachment;
  - determine information about a configuration of the one or more attachments based on the one or more indications and the output axis; and
  - control the motor based on the information about the configuration.

2. The modular power tool of claim 1, wherein the configuration comprises an orientation of the one or more attachments.

3. The modular power tool of claim 1, wherein, to determine the information about the configuration based on the one or more indications, the electronic controller is configured to:
- determine a distance of the attachment based on the movement; and
- determine the information about the configuration of the attachment based on the distance.

4. The modular power tool of claim 3, wherein the sensor comprises at least one selected from a group of an accelerometer, a gyroscope, and a depth sensor.

5. The modular power tool of claim 3, wherein the electronic controller is further configured to measure at least one selected from a group of a no-load current, a system response, a system efficiency, and a vibration characteristic to detect the attachment.

6. The modular power tool of claim 1, wherein, to control the motor based on the information about the configuration, the electronic controller is configured to:

detect, via the sensor, a kickback occurrence based on the information about the configuration; and in response to detecting the kickback occurrence, initiate a kickback mitigation to reduce a current to the motor.

7. The modular power tool of claim 1, wherein to control the motor, the electronic controller is configured to:

control at least one selected from a group of a maximum power of the motor, a torque of the motor, and a maximum speed of the motor based on the information about the configuration.

8. The modular power tool of claim 1, wherein, to determine the configuration based on the one or more indications, wherein the electronic controller is configured to:

obtain sensor data indicative of the information about the configuration of an attachment of the one or more attachments.

9. A method for adaptable motor control, comprising:

obtaining, via a sensor, one or more indications for one or more attachments to a modular power tool;

determining, based on the one or more indications, a movement of an attachment of the one or more attachments;

determining an output axis of the attachment based on the movement;

determining information about a configuration of the one or more attachments based on the one or more indications and the output axis; and controlling a motor of the modular power tool based on the information about the configuration.

10. The method of claim 9, wherein the configuration comprises an orientation of the one or more attachments.

11. The method of claim 9, wherein, determining the configuration comprises:

determining a distance of the attachment based on the movement; and determining the configuration of the attachment based on the distance.

12. The method of claim 11, wherein the sensor comprises at least one selected from a group of an accelerometer, a gyroscope, and a depth sensor.

13. The method of claim 11, further comprising:

measuring at least one selected from a group of a no-load current, a system response, a system efficiency, and a vibration characteristic for detecting the attachment.

14. The method of claim 11, wherein the one or more attachments is attached to the modular power tool such that the motor causes the movement of the attachment, the output axis of the attachment comprises a virtual line on which the attachment is configured to receive a drill bit or a driver bit, and the distance of the attachment is from the output axis of the attachment to the electronic controller in a right angle to the output axis.

15. The method of claim 11, wherein controlling the motor comprises:

detecting, via the sensor, the output axis not being parallel or right-angled to a ground surface; and in response to the output axis not being parallel or right-angled to a ground surface, initiating a mitigation to reduce a current to the motor.

16. The method of claim 9, wherein, controlling the motor based on the configuration comprises:

detecting, via the sensor, a kickback occurrence based on the information about the configuration; and in response to detecting the kickback occurrence, initiating a kickback mitigation to reduce a current to the motor.

17. The method of claim 9, wherein controlling the motor comprises:

controlling at least one selected from a group of a maximum power of the motor, a torque of the motor, and a maximum speed of the motor based on the information about the configuration.

18. The method of claim 9, wherein, determining the information about the configuration based on the one or more indications comprises:

obtaining sensor data indicative of the configuration of an attachment of the one or more attachments.

19. A method for motor control, comprising:

obtaining, via a sensor, axis rotation indications corresponding to more than one axis of rotation;

determining a combined rotation parameter based on the axis rotation indications, where the combined rotation parameter is a rotation sum calculated by summing a value corresponding to each axis rotation indication; and controlling a motor based on the combined rotation parameter based on a comparison of the combined rotation parameter with a threshold.

20. The method of claim 19, wherein controlling the motor comprises:

detecting a kickback occurrence in response to the combined rotation parameter exceeding the threshold; and in response to detecting the kickback occurrence, initiating a kickback mitigation to reduce a current to the motor.

21. The method of claim 19, wherein the value corresponding to each axis rotation indication is at least one selected from a group including:

an absolute value of each axis rotation indication, or a square of each axis rotation indication.

* * * * *